US012650591B2

(12) United States Patent
Raab et al.

(10) Patent No.: US 12,650,591 B2
(45) Date of Patent: *\*Jun. 9, 2026*

(54) ACTUATOR AND BEAM STEERING MECHANISM USING AN ACTUATOR

(71) Applicant: Thorlabs Measurement Systems Inc., Blairstown, NJ (US)

(72) Inventors: Simon Raab, Santa Barbara, CA (US); Mark S. Longmuir, Tamworth, NH (US)

(73) Assignee: Thorlabs Measurement Systems Inc., Blairstown, NJ (US)

( * ) Notice: Subject to any disclaimer, the term of this patent is extended or adjusted under 35 U.S.C. 154(b) by 234 days.

This patent is subject to a terminal disclaimer.

(21) Appl. No.: 18/372,306

(22) Filed: Sep. 25, 2023

(65) Prior Publication Data

US 2024/0019690 A1    Jan. 18, 2024

Related U.S. Application Data

(62) Division of application No. 16/679,747, filed on Nov. 11, 2019, now Pat. No. 11,803,047.

(Continued)

(51) Int. Cl.
| | |
|---|---|
| *G02B 26/10* | (2006.01) |
| *H02K 3/46* | (2006.01) |
| *H02K 41/035* | (2006.01) |

(52) U.S. Cl.
CPC ......... *G02B 26/101* (2013.01); *G02B 26/105* (2013.01); *H02K 3/46* (2013.01); *H02K 41/0356* (2013.01); *H02K 2203/12* (2013.01)

(58) Field of Classification Search
CPC .... G02B 26/00; G02B 26/101; G02B 26/105; H02K 41/0356; H02K 11/00; H02K 11/22;

(Continued)

(56) References Cited

U.S. PATENT DOCUMENTS

| | | | | | |
|---|---|---|---|---|---|
| 4,266,180 | A | * | 5/1981 | Juvan ..................... | H02K 39/00 310/43 |
| 5,872,880 | A | * | 2/1999 | Maynard .............. | G02B 6/4226 385/83 |

(Continued)

FOREIGN PATENT DOCUMENTS

| | | | |
|---|---|---|---|
| CA | 2695791 A1 | | 2/2008 |
| JP | 0307537 | * | 7/1991 |

(Continued)

OTHER PUBLICATIONS

Non-final Office Action issued by The USPTO for U.S. Appl. No. 16/679,747, dated Jun. 24, 2022.

(Continued)

*Primary Examiner* — Pinping Sun
(74) *Attorney, Agent, or Firm* — Myers Wolin, LLC

(57) ABSTRACT

An actuator may include a stator supporting a magnet; a stationary pole; and a bobbin supporting a winding of a coil, the bobbin being coaxial with the stator and stationary pole, and positioned inside the magnet and outside the stationary pole. A gap may be provided between the bobbin and the stationary pole. A beam steering mechanism may include a mirror; a frame; a pivot anchor fixed to the frame and connected to the mirror; and an actuator. An output end of the actuator may be connected to the rear surface. A beam steering mechanism may alternatively include a flexure; a mirror attached to the flexure; a frame; supports fixed to the frame and the flexure; a pivot anchor fixed to the frame and connected to the mirror or the flexure; and an actuator. An output end of the actuator may be connected to the flexure.

17 Claims, 10 Drawing Sheets

Related U.S. Application Data

(60) Provisional application No. 62/800,770, filed on Feb. 4, 2019.

(58) Field of Classification Search
CPC .. H02K 3/00; H02K 3/46; H02K 7/00; H02K 7/14

See application file for complete search history.

(56) References Cited

U.S. PATENT DOCUMENTS

| | | | | |
|---|---|---|---|---|
| 6,574,026 | B2 * | 6/2003 | Jin | B81B 7/0067 |
| | | | | 359/224.1 |
| 8,111,345 | B2 | 2/2012 | Ono | |
| 10,500,676 | B2 | 12/2019 | Candiloro et al. | |
| 11,803,047 | B2 * | 10/2023 | Raab | H02K 3/46 |
| 2006/0044655 | A1 * | 3/2006 | Fischer | B23K 26/10 |
| | | | | 359/200.7 |
| 2006/0153413 | A1 | 7/2006 | Nakajima et al. | |
| 2011/0135111 | A1 | 6/2011 | Suzuki | |
| 2012/0025633 | A1 | 2/2012 | Lee et al. | |
| 2014/0340574 | A1 | 11/2014 | Han | |
| 2015/0219179 | A1 | 8/2015 | Cui | |
| 2016/0233793 | A1 * | 8/2016 | Henderson | H02N 2/103 |
| 2016/0279808 | A1 | 9/2016 | Doughty et al. | |
| 2017/0244310 | A1 * | 8/2017 | Candiloro | H02K 11/33 |
| 2017/0278608 | A1 | 9/2017 | Kusunoki et al. | |

FOREIGN PATENT DOCUMENTS

| | | | |
|---|---|---|---|
| JP | 03075377 U | | 7/1991 |
| JP | 2009019684 A | * | 1/2009 |

OTHER PUBLICATIONS

Final Office Action issued by The USPTO for U.S. Appl. No. 16/679,747, dated Oct. 31, 2022.

Non-final Office Action issued by The USPTO for U.S. Appl. No. 16/679,747, dated Feb. 13, 2023.

Notice of Allowance issued by The USPTO for U.S. Appl. No. 16/679,747, dated Jun. 26, 2023.

* cited by examiner

ACTUATOR AND BEAM STEERING MECHANISM USING AN ACTUATOR

CROSS REFERENCE TO RELATED APPLICATIONS

This application is a divisional of U.S. patent application Ser. No. 16/679,747 filed on Nov. 11, 2019, which claims the benefit of U.S. Provisional Patent Application No. 62/800,770 filed on Feb. 4, 2019. The disclosures of U.S. patent application Ser. No. 16/679,747 and U.S. Provisional Patent Application No. 62/800,770 are hereby incorporated by reference.

TECHNICAL FIELD

The subject matter disclosed herein relates to an actuator and a beam steering mechanism using an actuator.

BACKGROUND

Many of today's advanced production processes require in-line quality control and in-process verification. This is especially important, for example, in aircraft manufacturing, where most of assembly operations are manual. In these types of applications, one hundred percent quality assurance is often desired. Hence, in-process measurement of 3-dimensional structures, parts, and assemblies is frequently used for validation. In a number of applications, especially involving composite materials, the non-contact methods are used for inspection purposes.

Further, laser systems commonly referred to as laser projectors are also widely used in contemporary manufacturing. Laser scanning technique in the form of laser projection is often utilized in production processes as a templating method in manufacturing of composite parts, in aircraft and marine industries or other large machinery assembly processes, truss building, painting, and other applications. It gives the user ability to eliminate expensive hard tools, jigs, templates, and fixtures. Laser projectors utilize computer-assisted design (CAD) data to generate glowing templates on a 3D object surface. Glowing templates generated by laser projection are used in production assembly processes to assist in the precise positioning of parts, components, and the like on any flat or curvilinear surfaces. Laser projection technology brings flexibility and full CAD compatibility into the assembly process. In the laser assisted assembly operation, a user positions component parts by aligning some features (edges, corners, etc.) of a part with the glowing template. After the part positioning is completed, the user fixes the part with respect to the article being assembled. However, the accuracy of laser projection, and, consequently, of the assembly process, is only adequate if the object is built exactly up to its CAD model. This is not the case for all applications, and as such there are a number of non-trivial issues associated with such applications. The combination of the laser projector with laser light detection and ranging ("LIDAR") provides a system that performs both placement and verifying functions.

In the above-described applications, a rapid and accurate beam steering mechanism is necessary for efficient processing. Typically, beam steering mechanisms may employ mirrors rotated by galvanometers to aim an incident laser beam. However, it is desirable to reduce power consumption of the beam steering mechanism, and to also increase an operating life of a beam steering mechanism by reducing wear of the component parts.

BRIEF DESCRIPTION

An embodiment of an actuator for use with a motor comprising a magnet and a coil may include a stator structured to support the magnet; a stationary pole arranged coaxially with the stator and provided to a radially inner side of the magnet; and a bobbin structured to support a winding of the coil, the bobbin being arranged coaxially with the stator and the stationary pole and positioned to a radially inner side of the magnet and a radially outer side of the stationary pole. An inner diameter of the bobbin may be larger than an outer diameter of the stationary pole so that a gap is provided between an inner surface of the bobbin and an outer surface of the stationary pole.

An embodiment of a beam steering mechanism includes a mirror including a first surface and a second surface opposite to the first surface, the first surface being a mirrored surface; a frame; a pivot anchor having a first end fixed to the frame and a second end connected to a pivot point of the second surface; and a first actuator comprising a first output end, the first output end of the first actuator being connected to a first point on the second surface of the mirror.

An embodiment of a beam steering mechanism includes a mirror including a first surface and a second surface opposite to the first surface, the first surface being a mirrored surface; a flexure having a first surface and a second surface, the first surface of the flexure being fixed to the second surface of the mirror; a frame; a plurality of supports, each of the plurality of the supports having a first end fixed to the frame and a second end fixed to the flexure; a pivot anchor having a first end fixed to the frame, and a second end connected to a pivot point of the second surface of the mirror through a hole in the flexure or connected to a pivot point of the second surface of the flexure; and a first actuator comprising a first output end, the first output end of the first actuator being connected to the flexure at a first point.

DETAILED DESCRIPTION

Figure 1:
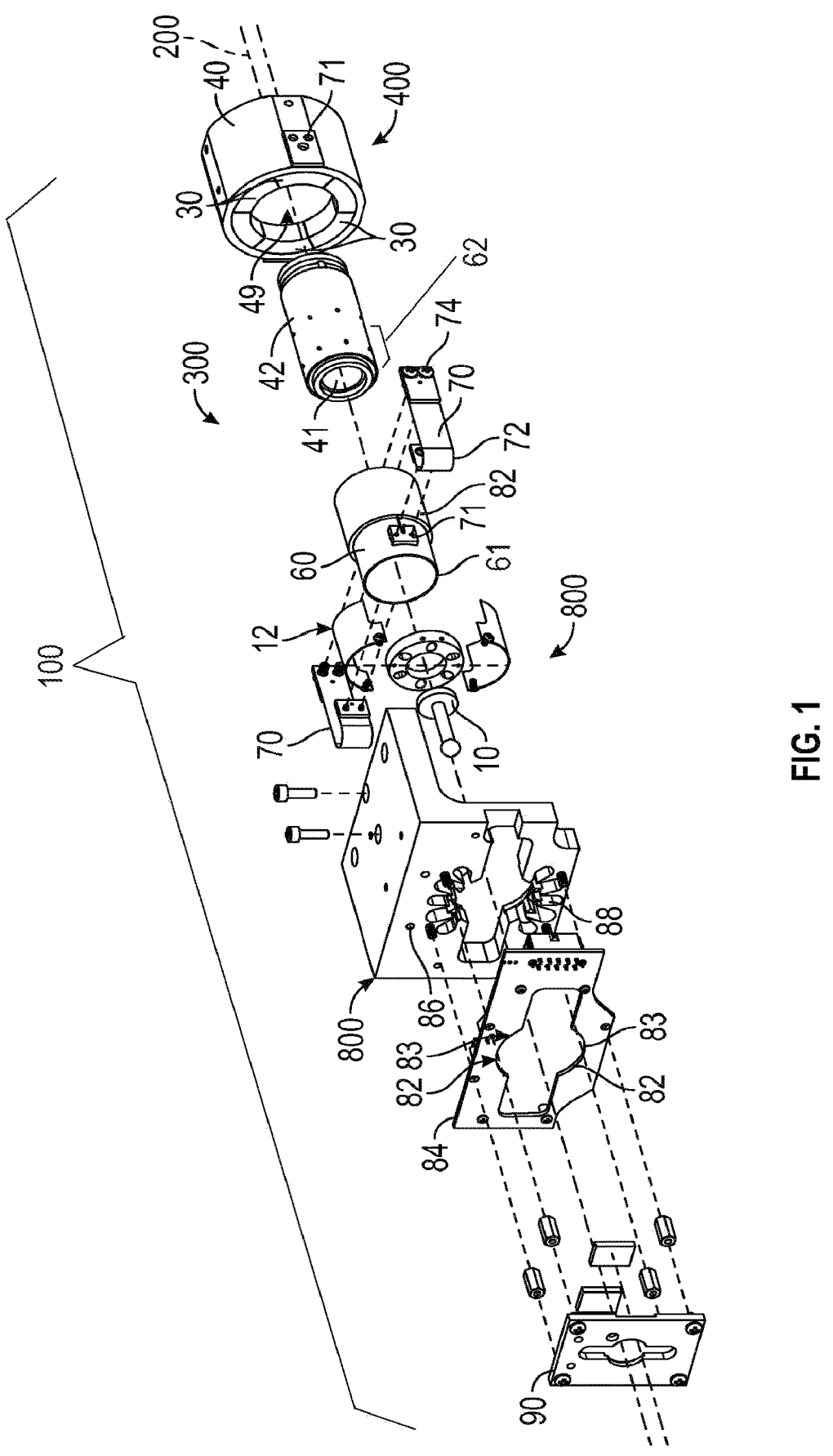
FIG. 1 is an exploded view of an actuator in accordance with an embodiment.
Figure 2:
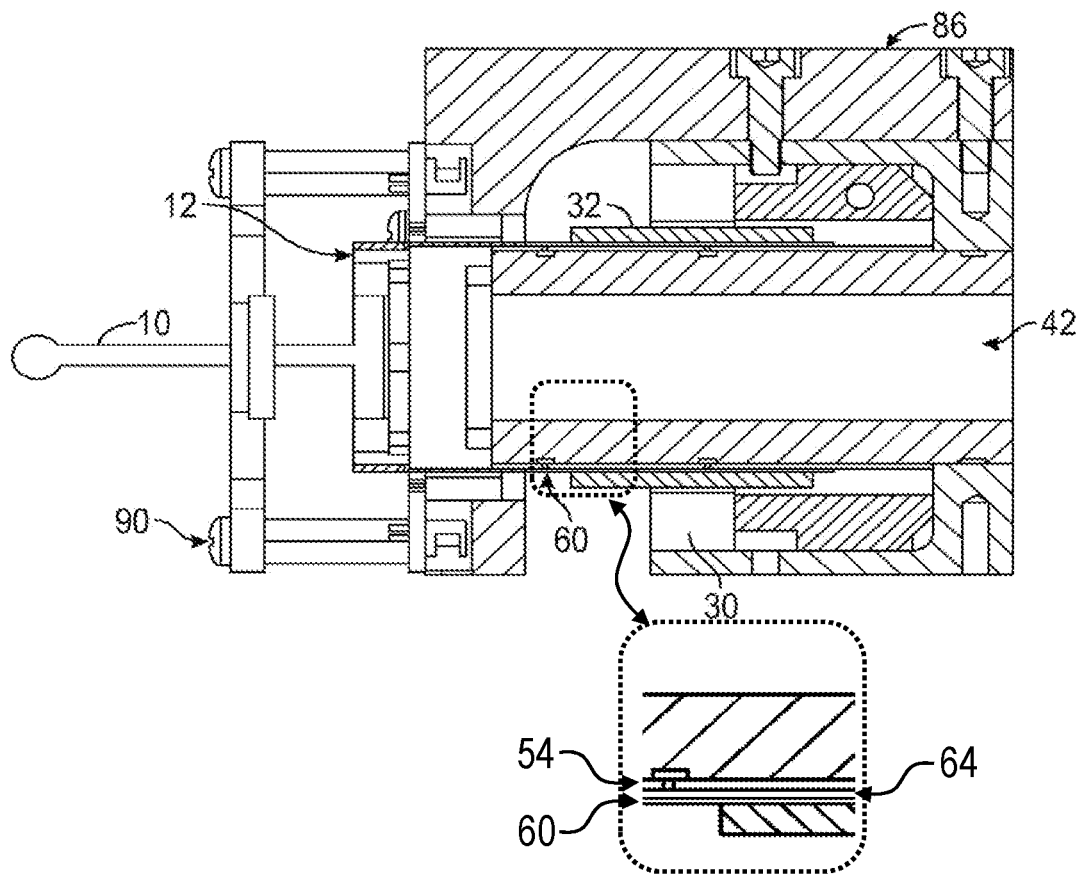
FIG. 2 is a cross-sectional view of an actuator along line A-A of FIG. 8 in accordance with an embodiment.

The description of illustrative embodiments according to principles of the present disclosure is intended to be read in connection with the accompanying drawings, which are to be considered part of the entire written description. In the description of embodiments of the disclosure herein, any reference to direction or orientation is merely intended for convenience of description and is not intended in any way to limit the scope of the present disclosure. Relative terms such as "lower," "upper," "horizontal," "vertical," "above," "below," "up," "down," "top" and "bottom" as well as derivative thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the disclosure are illustrated by reference to the exemplified embodiments. Accordingly, the disclosure expressly should not be limited to such exemplary embodiments illustrating some possible non-limiting combination of features that may exist alone or in other combinations of features; the scope of the disclosure being defined by the claims appended hereto.

The term "about" is intended to include the degree of error associated with measurement of the particular quantity based upon the equipment available at the time of filing the application.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

This disclosure describes the best mode or modes of practicing the disclosure as presently contemplated. This description is not intended to be understood in a limiting sense, but provides an example presented solely for illustrative purposes by reference to the accompanying drawings to advise one of ordinary skill in the art of the advantages and construction of the certain embodiments. In the various views of the drawings, like reference characters designate like or similar parts.

It is important to note that the embodiments disclosed are only examples of the many advantageous uses of the innovative teachings herein. In general, statements made in the specification of the present application do not necessarily limit any of the various claimed disclosures. Moreover, some statements may apply to some inventive features but not to others. In general, unless otherwise indicated, singular elements may be in plural and vice versa with no loss of generality.

An actuator is described in conjunction with translational movement of an actuator rod in a laser beam steering subsystem of a laser scanning system. The actuator may instead or in addition be used in other systems that repeatedly require rapid translational movements of light weight objects over relatively short distances, e.g., small numbers of millimeters.

Referring to FIGS. 1-2 and 6-9, an actuator 100 provides rapid translational movement of an actuator rod 10 along a central axis 200 (denoted by dotted lines). The actuator includes a voice coil motor 300. One or more voice coil motor magnets 30 are supported on a base 40 of a stator 400. The windings of a voice coil 32 of the voice coil motor 300 are positioned on a lightweight moveable bobbin 60, which connects at one end 61 to move the actuator rod 10 translationally in either direction along the central axis 200. The bobbin 60 is sized to move over a distal end 62 of a stationary pole 42, which includes a center bore 41 that coincides with the central axis 200. In other words, stationary pole 42 is coaxial with stator 400, and is positioned to a radially inner side of the stator 400, magnets 30, bobbin 60 is positioned to a radially outer side of stationary pole 42. An inner diameter of bobbin 60 is larger than an outer diameter of stationary pole 42. As described in more detail below, the pole 42 provides, in a gap 64 between the bobbin 60 and the pole 42, a thin layer of air on which the bobbin 60 moves under the control of the voice coil motor 300. The bobbin thus moves translationally over the distal end 62 of the pole 42 essentially without making direct contact with the pole.

Figure 3:
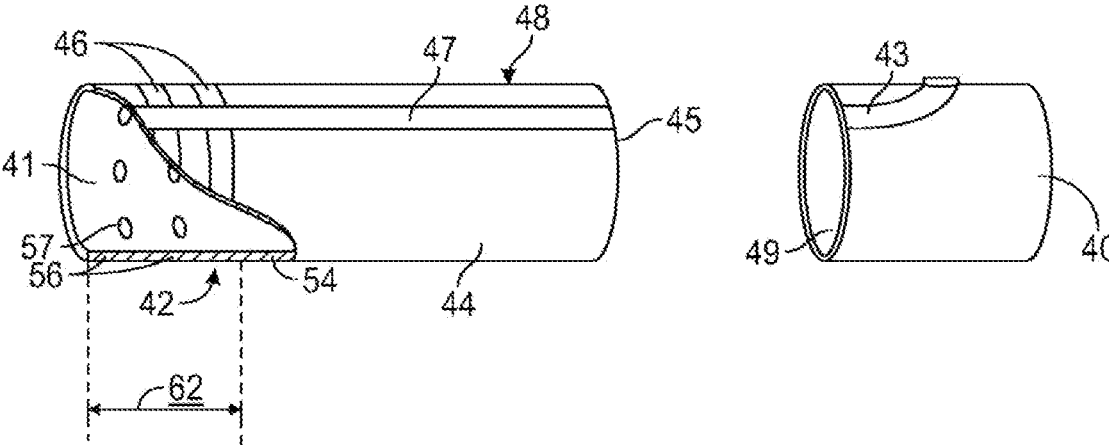
FIG. 3 is a cut-away view of a portion of an actuator in accordance with an embodiment.

Referring also to FIG. 3, the pole 42 includes a cylinder 44 and an outer shell 54. The cylinder is constructed of material that provides a flux path for the magnetic circuit of the voice coil motor 300. In the example, the cylinder is made of low carbon steel. The cylinder 44 is drilled through to provide the center bore 41. At the distal end 62, a series of circumferential grooves 46 are cut along the outside of the cylinder 44 as part of an air path 48. The air path 48 further includes an axial channel 47 that extends between the grooves 46 and a proximal edge 45 of the pole 42, to provide an inlet for air.

The outer shell 54 of the pole 42 includes one or more sets 56 of holes 57 in locations that correspond to the locations of the circumferential grooves 46. In the example, two sets 56 of holes 57 are spaced around the two circumference of the shell 54 in locations that correspond to the circumferential grooves 46. The outer shell 54, in the example, is constructed of 0.5 mm thick stainless steel and is thermally shrunk over the cylinder 44. The outer diameter of the pole 42 is ground to be slightly smaller than the inner diameter of the bobbin 60, to provide the gap 64 between the bobbin 60 and the pole 42. In the example, the assembled pole 42 has an outer diameter that is 16 microns (0.016 mm) less than the inner diameter of the bobbin 60.

The pole 42 fits into a center opening 49 in the stator base 40, such that the axial groove 47 of the air path 48 aligns with and connects to one side of a port 43 through which air is supplied from an air source (not shown), for example, a compressor. In other words, a positive air pressure is supplied to the gap 64. The bobbin 60 slides over the distal end 62 of the pole 42, leaving the gap 64 between the two components. When air is supplied through the port 43 to the air path 48, a film of air is produced within the gap 64, and the bobbin 60 moves translationally relative to the pole 42 on the film of air under the control of the voice coil motor

300. The bobbin thus moves essentially without making direct contact with the pole, and frictional wear to the bobbin is minimized. In at least an embodiment, a permanent dry film lubricant may be used in place of the positive air pressure in gap 64.

The air path 48 as illustrated includes two circumferential grooves 46 and two sets 56 of holes 57. The holes 57 have 0.18 mm diameters and a set consists of 6 holes that are spaced evenly around the circumference of the shell 54. The circumferential grooves are located and spaced to provide a thin film of air that coincides with the maximum distance over which the bobbin 60 may be driven to move by the voice coil motor 300. The air path 48 may be designed to cover the maximum distance 62 with fewer or more circumferential grooves 46, as needed, and the number of sets 56 of holes 57 and the number of holes in each set may be increased or decreased accordingly.

The bobbin 60 is a thin-walled, light weight hollow cylinder with an inner diameter that is sized to move over the distal end section 62 of the pole 42 on the air layer provided in the gap 64. As discussed, the voice coil 32 is mounted on the bobbin 60. A distal end 62 of the bobbin extends slightly beyond the voice coil windings, to connect to an actuator rod mount 12, which in turn holds the actuator rod 10. The actuator rod 10, in one example, may be 38 mm in length and made of a lightweight carbon compound. Actuator rod 10 extends in an axial direction (i.e., along center axis 200) away from the bobbin. The bobbin 60 is constructed of a relatively stiff, thermally conductive material. In the example, the bobbin is 41 mm long and is constructed of a thermally conductive ceramic with a high specific stillness, such as, aluminum oxide. The thickness of the bobbin wall is approximately 0.5 mm.

The combined light weight and high specific stiffness of the relatively short cylindrical bobbin allows the bobbin to rapidly move the actuator rod 10 the expected short distances, i.e., small numbers of millimeters, and settle the actuator rod into new positions along the central axis 200 without significant residual vibration.

The thermally conductive material of the bobbin 60 conducts heat produced by the voice coil 32 to the thin film of air over which the bobbin moves. The exhaustion of the air out of the system through the open ends of the gap 64 dissipates the heat produced by the voice coil. The voice coil motor 300 can thus continue to operate efficiently without requiring additional components for cooling the voice coil to be included in the system.

Figure 5:
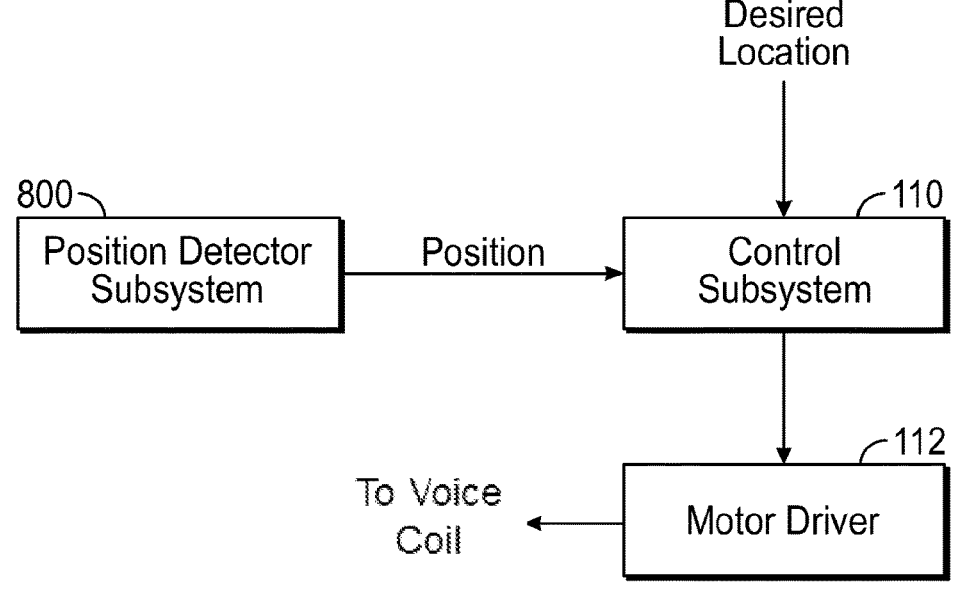
FIG. 5 is a functional block diagram of a control subsystem for use with an actuator in accordance with an embodiment.
Figure 6:
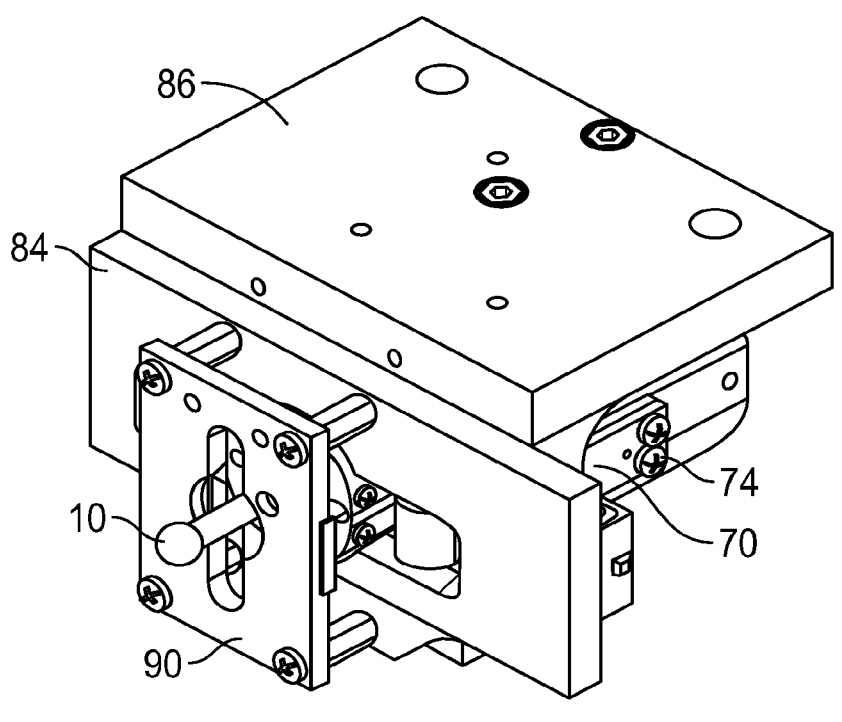
FIG. 6 is a perspective view of an actuator in accordance with an embodiment.
Figure 7:
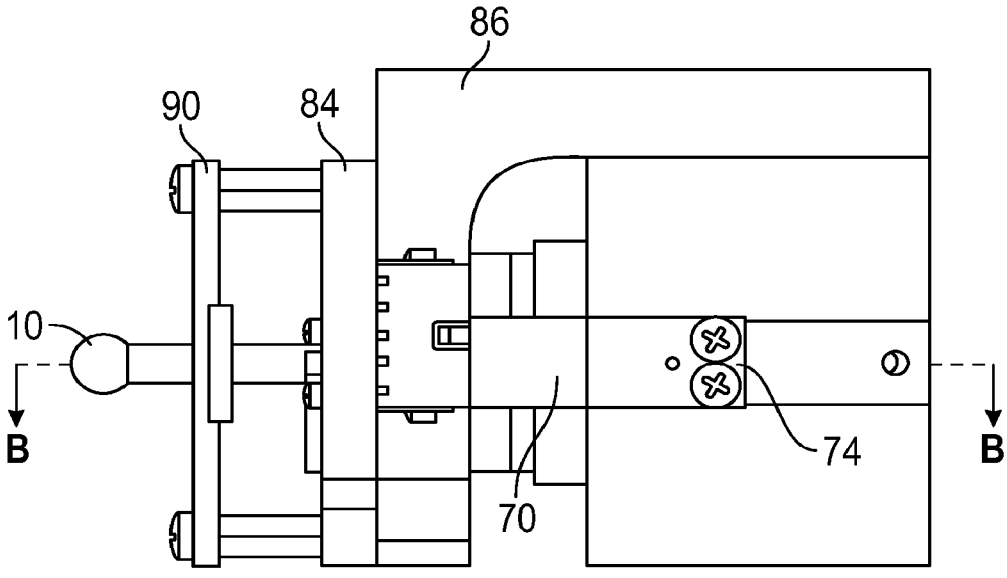
FIG. 7 is a side view of an actuator in accordance with an embodiment.
Figure 8:
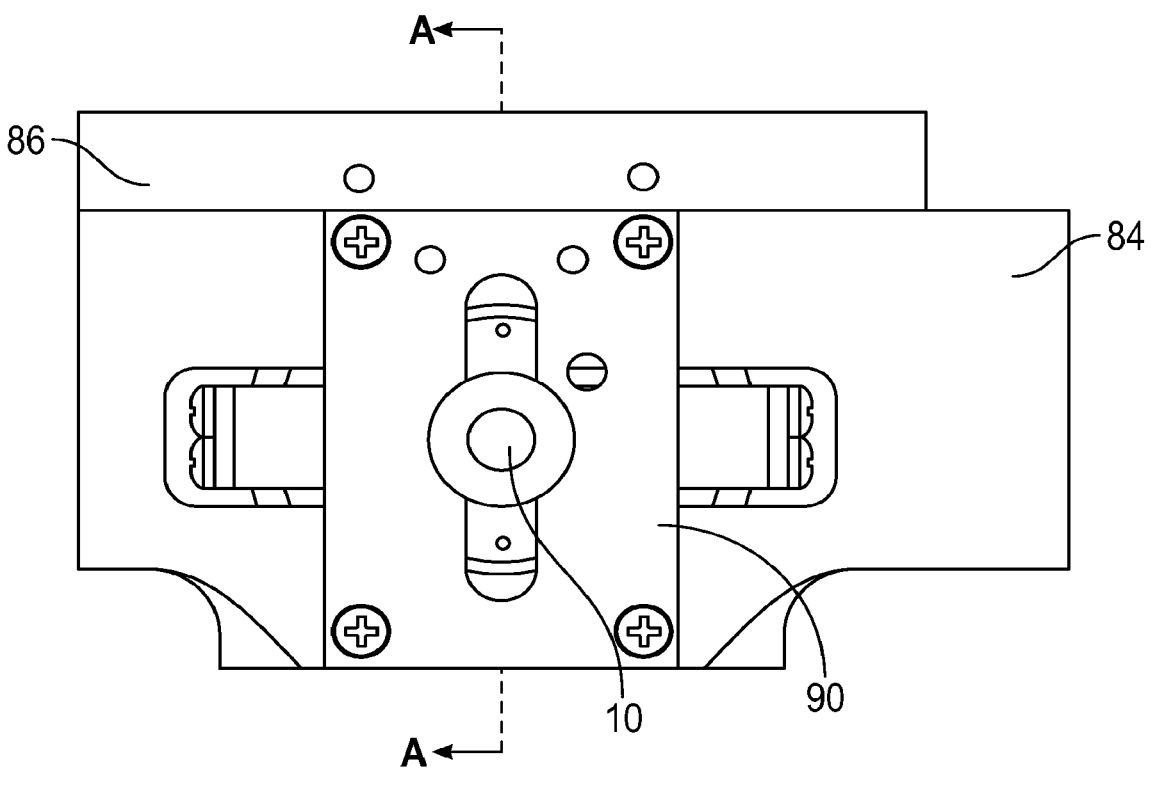
FIG. 8 is a front view of an actuator in accordance with an embodiment.
Figure 9:
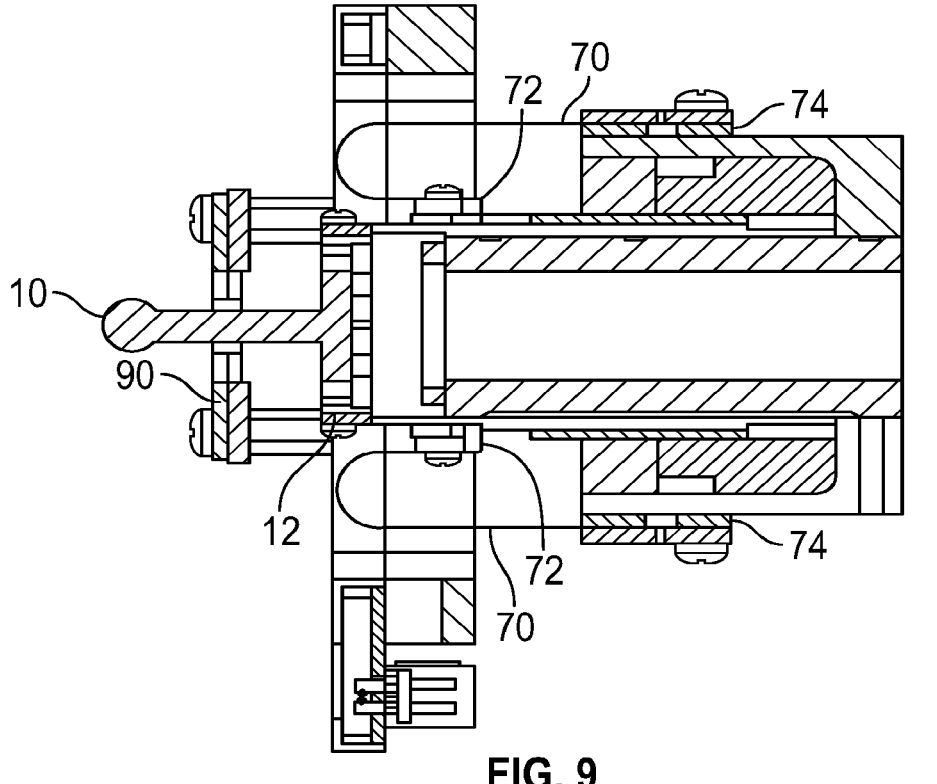
FIG. 9 is a cross-sectional view of an actuator along line B-B of FIG. 7 in accordance with an embodiment.

One or more pairs of flexible circuits 70 provide energy to the voice coil 32. The respective flexible circuits 70 attach at a first end 72 to the bobbin 60 and connect to an end of the voice coil 32, the second ends 74 of the respective flexible circuits, attach to the stator base 40 and connect to wires of a motor driver 12 (FIG. 5). The flexible circuits 70 are constructed in a known manner as a single layer of copper between layers of polyamide. The flexible circuits attach to the bobbin 60 and stator base 40 via anchors 71. The flexible circuits 70 are the only connection between the stationary and the moving parts of the actuator, and add minimal weight to the moveable bobbin 60.

The flexible circuits 70 are designed to make a 180° fold and are installed such that the fold rolls as the bobbin 60 moves the actuator rod 10 along the central axis 200. The copper layer is at the neutral axis of the bend. To minimize stress in the copper and polyimide layers, the flexible circuits 70 are designed with a relatively large ratio of radius to thickness, e.g., on the order of 20.

To constrain the bobbin 60 against rotational movement around a central axis of the system, that is, relative to the stator 400, the flexible circuits 70 are aligned on opposite sides of the bobbin 60. Further, the flexible circuits are designed to be relatively wide compared to their thickness, for example, the flexible circuits may be 10 mm wide and 0.1 mm thick. In the example, a single pair of flexible circuits 70 is utilized, however, additional pairs of flexible circuits may be arranged on opposing sides of the bobbin, as needed to constrain the rotational movement. Constraints on the pitch and tilt of the bobbin 60 relative to the center bore 49 of the stator 400 are provided by the pole 42 over which the bobbin moves. Further, a stop 90 may be included as a constraint for the maximum translational movement of the actuator rod 10.

The system further includes a position detector subsystem 800 (FIG. 5) that provides information about the relative position of the bobbin 60, and thus, the position of the actuator rod 10 along the central axis 200. The position detector subsystem does not contact the bobbin 60 and thus does not add mass to the moving component of the actuator. The position detector subsystem includes a plurality of infrared emitters and detectors 82, 83 that are arranged circumferentially at a known point along the maximum distance traveled by the bobbin 60. A stationary mount 84 holds the respective emitters and detectors in place. The mount 84, in turn, attaches to a structure 86 that includes grooves 88 that block extraneous light from reaching the photodetectors 83.

It will be understood that there may be some residual rotation of bobbin 60 resulting from the yield of flexible circuits 70. However, the accuracy of position of actuator rod 10 and the accuracy of the position detector subsystem 800 will not be affected by residual rotation of bobbin 60; in at least an embodiment, pole 42 is ground with sufficient precision such that several degrees of rotation may result during operation of the device without having an adverse effect on its operation.

Figure 4:
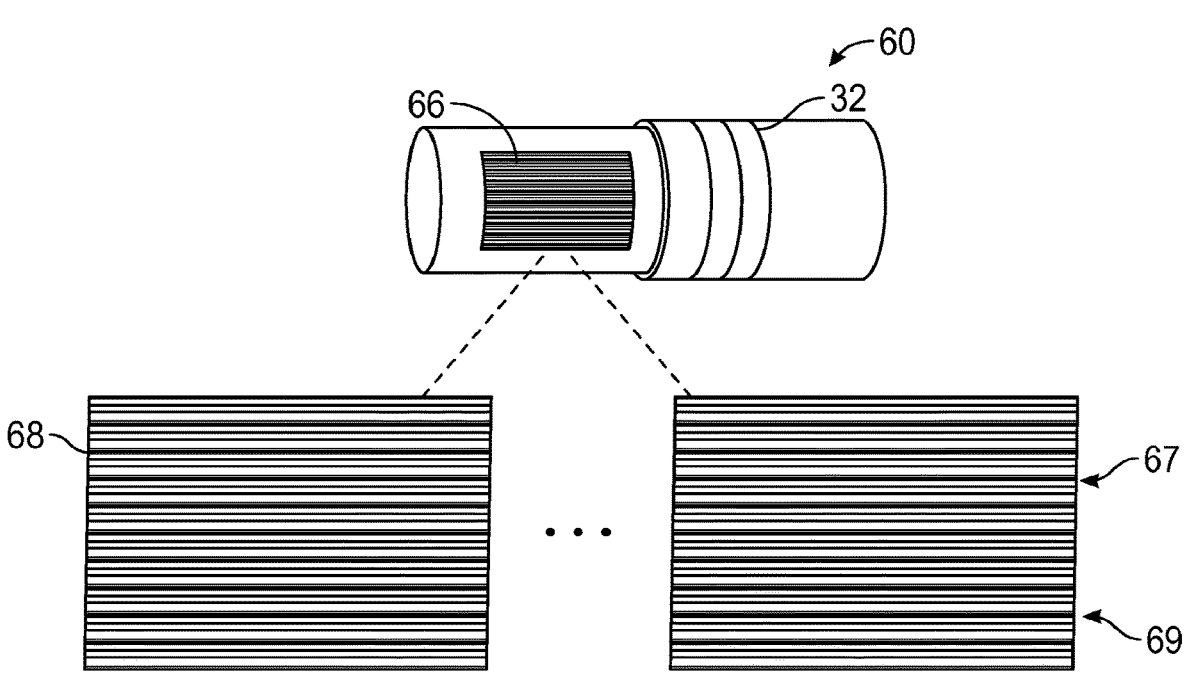
FIG. 4 is view of a bobbin of an actuator in accordance with an embodiment.

Referring also to FIG. 4, the bobbin 60 has imprinted thereon, either directly or as an added coating, an optical pattern 66 consisting of a plurality of wedges 68 that have reflective and antireflective orientations. In the example, the pattern 66 is printed on a thin aluminum substrate which is then formed and bonded to the ceramic bobbin 60.

The pattern 66 utilizes alternating channels 68, 69 that have different reflective and anti-reflective orientations. As the bobbin 60 moves, the reflective and anti-reflective channels are in particular locations relative to the stationary emitters and detectors 82, 83. Accordingly, at any given time, the light reflected by the pattern 66 to the respective photodetectors 83 corresponds to the relative positions of the reflective and antireflective channels 67, 69 and the position of the bobbin can be accurately determined based on the relative intensities of the light at the respective photodetectors.

Duplicates of the pattern 66 may be included at multiple locations around the circumference of the bobbin 60, such that the responses of the photodetectors 83 arranged circumferentially on the mounting 84 may be averaged to determine the relative position of the bobbin.

The pattern 66 consists of wedges 68, which are arranged in multiple sets in each of the two opposing channels 67, 69. In one channel the wedges transition from light to dark (more reflective to less reflective), while in the adjacent channel the transitions are reversed. As the bobbin 60 moves, one of the channels will generate an increasing photocurrent in the photodetectors, while the other channel will generate a correspondingly smaller photocurrent. The difference of the two signals corresponds to the relative position of bobbin 60. In the example, the emitters and photodetectors 82, 83 are situated at the center of the maximum path traveled by the bobbin 60, and when the bobbin is at the mid-point the two photocurrents are equal and hence the difference is zero. Travel toward one end of the path over which the bobbin moves will yield an increasingly positive difference signal, while travel in the reverse direction will yield an increasing negative signal. The channels are arranged such that the difference signal changes linearly with the movement of the bobbin 60.

The wedges 68 are approximately 0.150 mm wide and taper to 0.075 mm. A gap of roughly the same size separates the individual wedges. The size and spacing of the respective wedge lines in the pattern 66 are chosen to provide an averaging of a plurality of individual wedges 68 within the field of view of the photodetectors 83. The averaging reduces position errors due to defects or inconsistencies in the printing of the pattern 68 on the bobbin 60. The arrangement of multiple emitters and detectors 82, 83 circumferentially along path over which the bobbin moves ensures both even illumination and a field of view that includes the respective channels, to ensure that the system is insensitive to minor rotations of the bobbin. The inclusion on the bobbin 60 of at least duplicate patterns separated by 180 degrees provides additional averaging and insensitivity to any radial offset of the bobbin 60, as the bobbin moves.

For ease of understanding, the system components that operate in a known manner to determine the locations to which the actuator rod 10 is to be moved along the central axis 200 are not shown. Referring now also to FIG. 5, the desired location information is provided by the system components to a control subsystem 110, which in turn operates the motor driver 112 that controls the voice coil motor 300. The control subsystem 110 also receives, from the position detection subsystem 800, information relating to the relative position of the bobbin 60, and thus, the location of the actuator rod 10 along the central axis 200. Based on the position information and the desired location information, the control subsystem 110 operates the motor driver 112 to control the direction and the duration of the current provided to the voice coil 32, which directs the movement of the bobbin 60 from its current position to a next position to move the actuator rod 10 to the desired next location along central axis 200.

As discussed, the actuator 100 may be used in the same manner to move other small, lightweight objects translationally along a path that coincides with the directions of the movement produced via the voice coil 32. The object is connected to and thus moves with the bobbin and the control subsystem 10 operates in the same manner to control the voice coil motor 300 to move the bobbin from a current position to a next position relative to a stationary pole 42 that provides the thin film of air over which the bobbin moves.

In brief summary, the actuator 100 efficiently operates to rapidly move a minimal mass including the bobbin 60, the supported voice coil 32, the actuator rod 10 and the actuator rod mount 12 under the control of the voice coil motor 300. The voice coil motor 300 operates in a known manner to drive the voice coil and thus the bobbin 60 transversely relative to the stationary stator, which houses the voice coil magnets 30. Accordingly, additional components are not required to translate the motion from, for example, the rotational motion provided by a ball bearing to the translational motion along the beam axis of the central axis. The bobbin 60 moves on a thin film of air provided in the gap 64 by the air flow path 48 of the stationary pole 42, thus minimizing associated frictional wear. The bobbin 60 is constructed of thermally conductive material that conducts the heat that is produced by the voice coil 32 to the film of air over which the bobbin moves. As the air exhausts out of the ends of gap 64 between the bobbin 60 and the pole 42, the heat is dissipated. Accordingly, there is no need for additional components for the cooling of the voice coil. Furthermore, the bobbin is constructed of a light weight material that is sufficiently stiff to minimize associated settle time.

Figure 10:
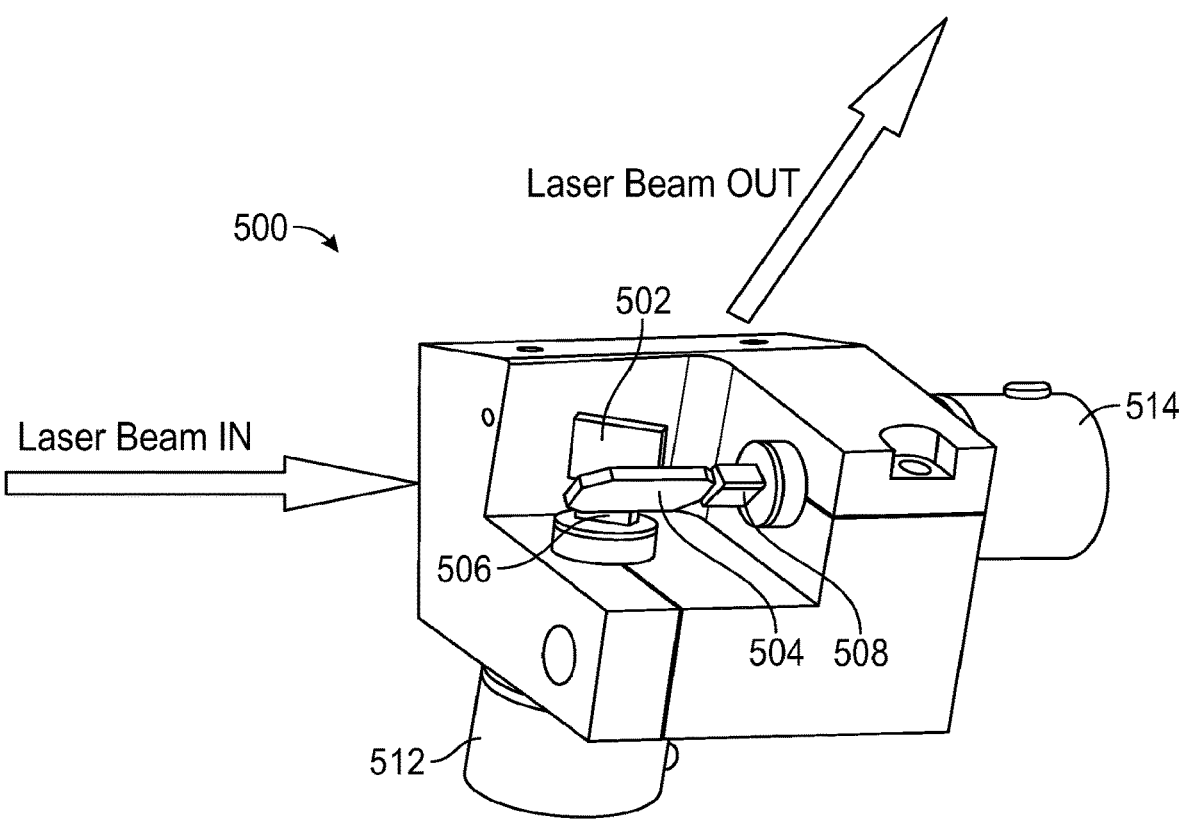
FIG. 10 is a perspective view of a beam steering mechanism.

An embodiment of the actuator described above can also be used in a beam steering mechanism. In a conventional beam steering mechanism, as illustrated in FIG. 10, an incident laser beam is directed by mirrors 502, 504 in a desired direction. Each of mirrors 502, 504 is connected via clamps 506, 508 to galvanometers 512, 514. Each of the galvanometers 512, 514 can be controlled to rotate mirrors 502, 504 around an axis of rotation. By independently controlling the rotation of mirrors 502, 504, an aiming direction of the outgoing laser beam can be varied in two dimensions.

Figure 11:
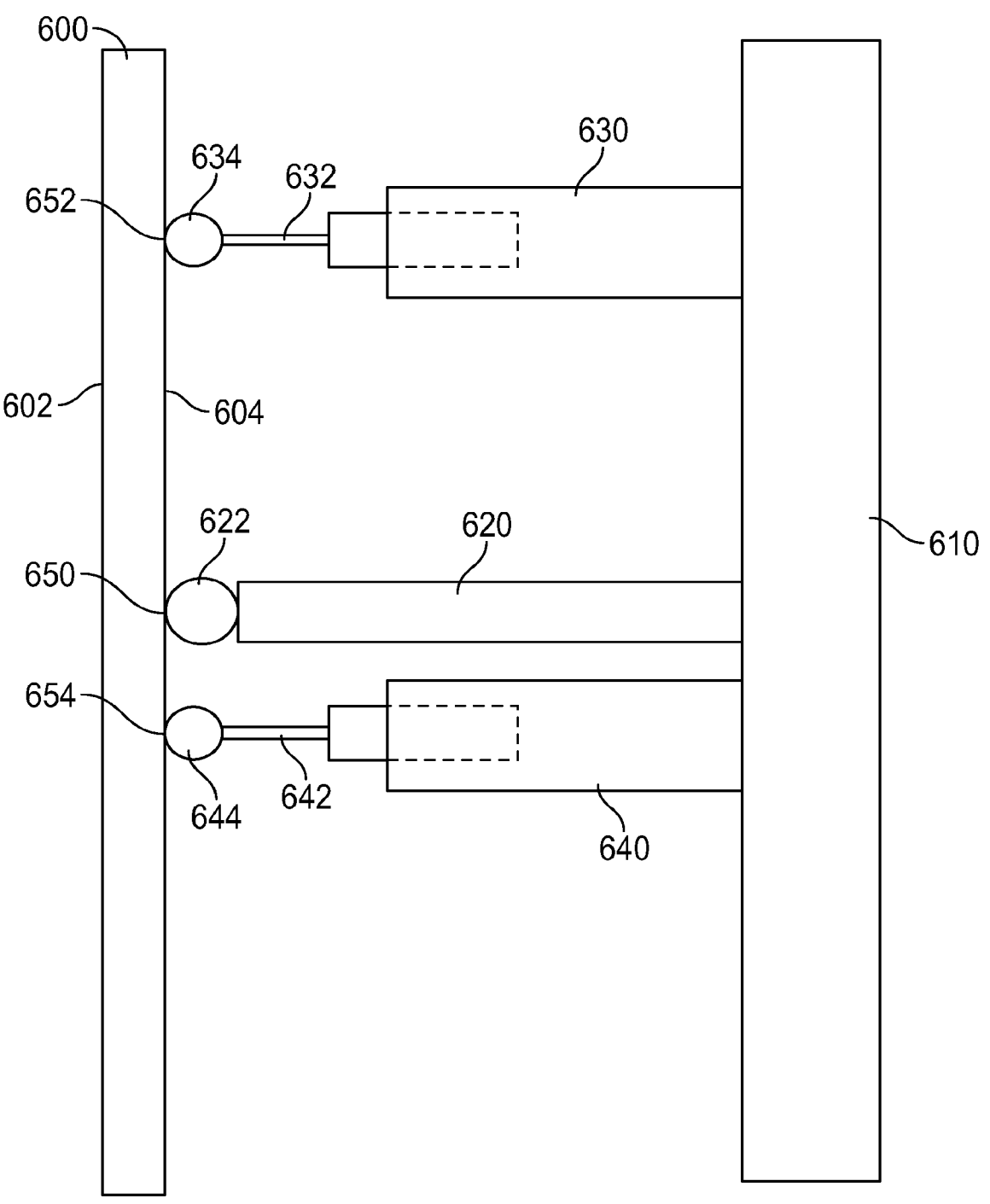
FIG. 11 is a schematic of a beam steering mechanism in accordance with an embodiment.

As seen in FIG. 11, actuators 630, 640 can be used instead of galvanometers in a beam steering mechanism. For example, a beam steering mechanism may include a mirror 600 having a first surface 602 and a second surface 604 opposite to the first surface 602. First surface 602 is a mirrored surface to reflect and aim an incident laser beam. The beam steering mechanism may further include a frame 610, and a pivot anchor 620 may have a first end fixed to the frame 610. A second end of pivot anchor 620 may be pivotably connected to a pivot point 650 of the second surface 602 via anchor ball pivot 622. The beam steering mechanism may further include a first actuator 630. A first output end of first actuator 630 may be connected to a first point 652 on the second surface 602. In the embodiment of FIG. 11, the first output end of first actuator 630 is pivotably connected to first point 652 by first ball pivot 634 provided on an output end of first actuator rod 632. The beam steering mechanism may further include a second actuator 640. A second output end of second actuator 640 may be connected to a second point 654 on the second surface 602. In the embodiment of FIG. 11, the second output end of second actuator 640 is pivotably connected to second point 654 by first ball pivot 644 provided on an output end of first actuator rod 642. First actuator 630 and second actuator 640 may be actuators as described above and illustrated in FIGS. 1-2 and 6-9. The incident laser beam may be aimed by independently controlling first actuator 630 and second actuator 640 to extend or retract, which causes mirror 600 to pivot around pivot point 650.

Figure 15:
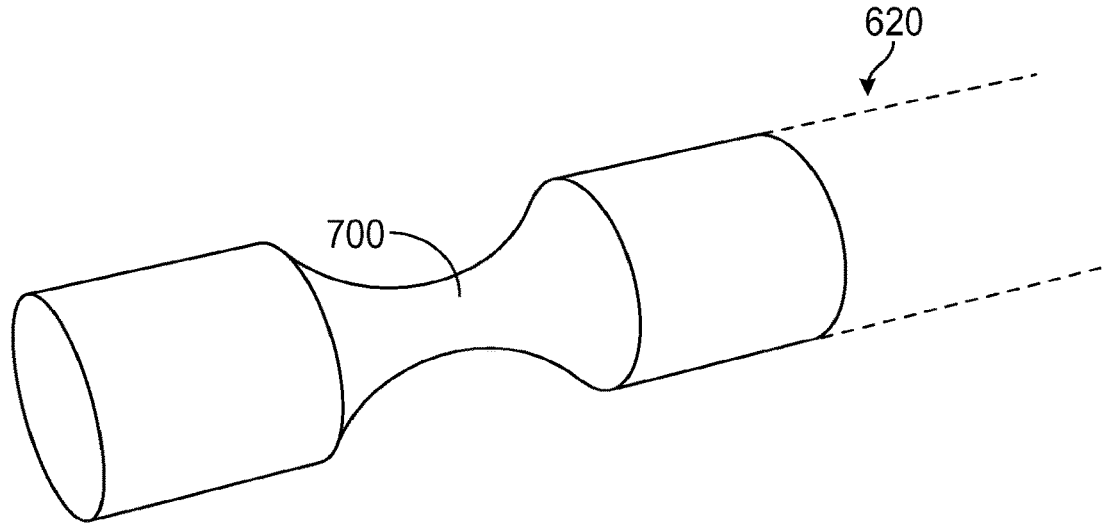
FIG. 15 is a perspective view of a flexure pivot in accordance with an embodiment.

FIG. 11 shows that pivot anchor 620, first actuator 630, and second actuator 640 are connected to mirror 600 via ball pivots. However, it will be understood that other suitable structures such as a flexure pivot 700 may be used, as shown in present FIG. 15. Flexure pivot 700 may increase the life of the beam steering mechanism because it is not subject to frictional wear found in ball pivot joints.

Figure 12:
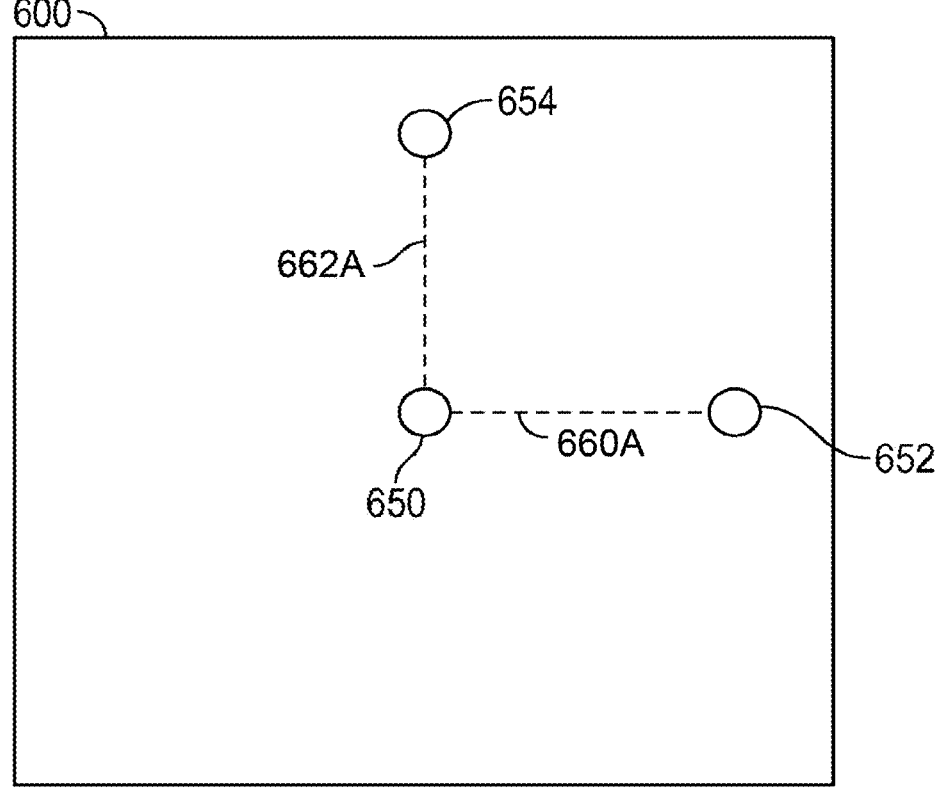
FIG. 12 rear view of a mirror in a beam steering mechanism in accordance with an embodiment.

FIG. 12 shows a rear side view of mirror 600 to illustrate an arrangement of the pivot anchor 620, first actuator 630, and second actuator 640 by showing one possible arrangement of the pivot point 650, first point 652, and second point 654. Anchor pivot point 650 and first point 652 are connected by a first imaginary line 660A, and anchor pivot point 650 and second point 654 are connected by a second imaginary line 662A. As seen in FIG. 12, first imaginary line 660A and second imaginary line 662A are non-parallel, which allows mirror 600 to move with two degrees of freedom, thereby allowing an aiming direction of the incident laser beam to be varied in two dimensions. While the embodiment of FIG. 12 shows that first imaginary line 660A and second imaginary line 662A are orthogonal, it should be appreciated that this is for exemplary purposes and the claims should not be so limited. In other embodiments, mirror 600 can have two degrees of freedom as long as first imaginary line 660A and second imaginary line 662A are non-parallel.

While FIGS. 11-12 show an embodiment with one mirror 600 and two actuators 630, 640 acting on mirror 600, it will be understood that similar control of an aiming direction of a laser can be achieved by using two mirrors with one actuator acting each of the two mirrors. In this modified embodiment, a first actuator would cause a first mirror to rotate around a first axis, and a second actuator would cause a second mirror to rotate around a second axis, similar to the arrangement of the mirrors and galvanometers shown in FIG. 10.

The beam steering mechanism shown in FIGS. 11-12 provides notable advantages over a beam steering mechanism using galvanometers, such as the mechanism shown in FIG. 10. For example, a galvanometer-based beam steering mechanism may be capable of providing 30G of acceleration with a power requirement of 50-60 W. In contrast, the beam steering mechanism shown in FIGS. 11-12 is capable of providing 50G of acceleration with a power requirement of 13 W due in part to the near-frictionless operation of the actuators. In other words, a beam steering mechanism in accordance with an embodiment allows for faster aiming of a laser at a fraction of the power requirement.

Figure 13:
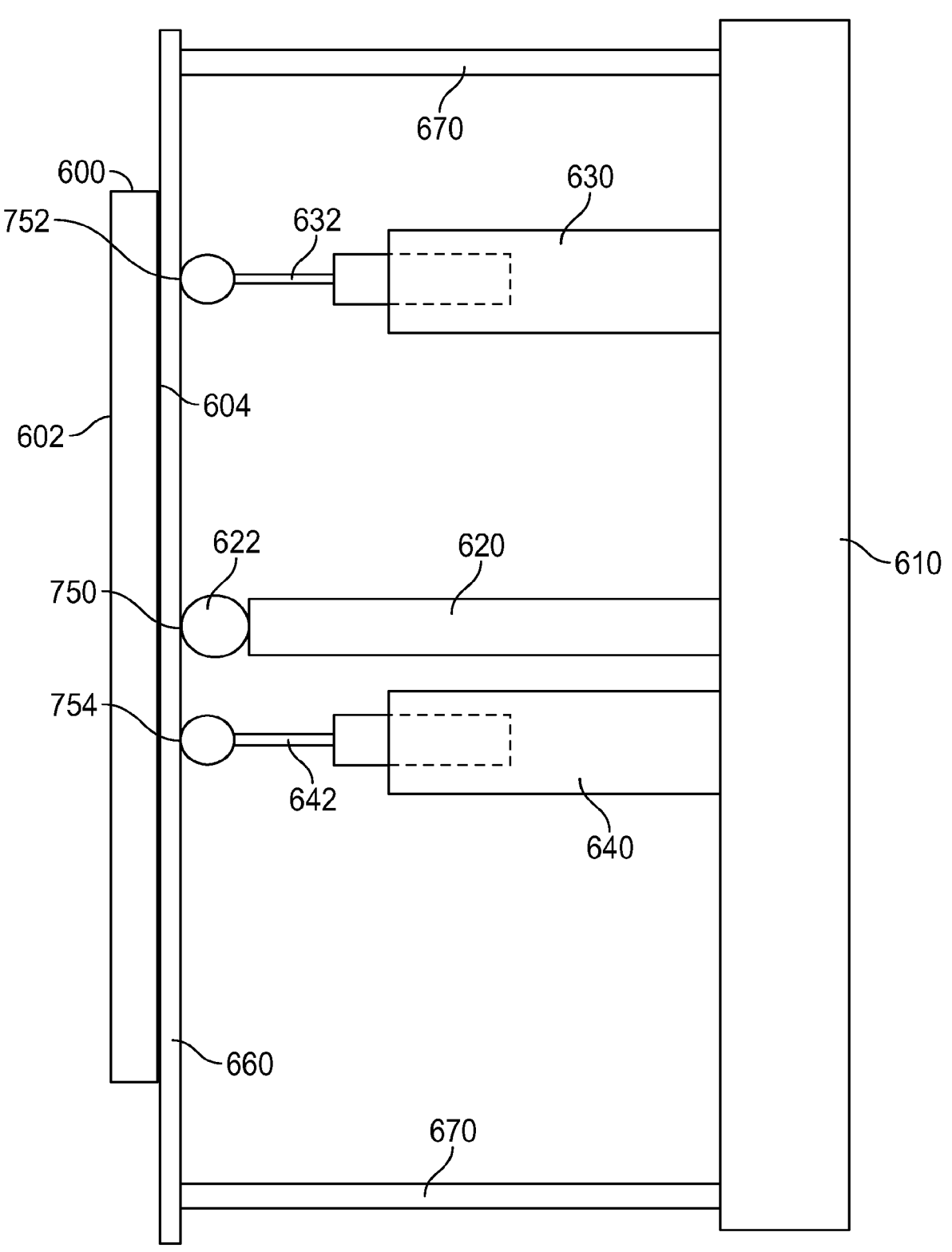
FIG. 13 is a schematic of a beam steering mechanism in accordance with an embodiment.

FIG. 13 shows another embodiment of a beam steering mechanism. In FIG. 13, mirror 600 is attached to a fulcrum of flexure 660. Flexure 660 may be a flat spiral flexure formed of a thin metal, thin plastic, or similar flexible material. Supports 670 may be fixed to each of the frame 610 and flexure 660 to prevent rotation or displacement of flexure 660 and mirror 600. Pivot anchor may be connected to a pivot point 750 on flexure 660 or connected directly to mirror 600 through a hole in flexure 660. A first output end of first actuator 630 may be connected to a first point 752 on flexure 660, and a second output end of second actuator 640 may be connected to a second point 754 on flexure 660.

Figure 14:
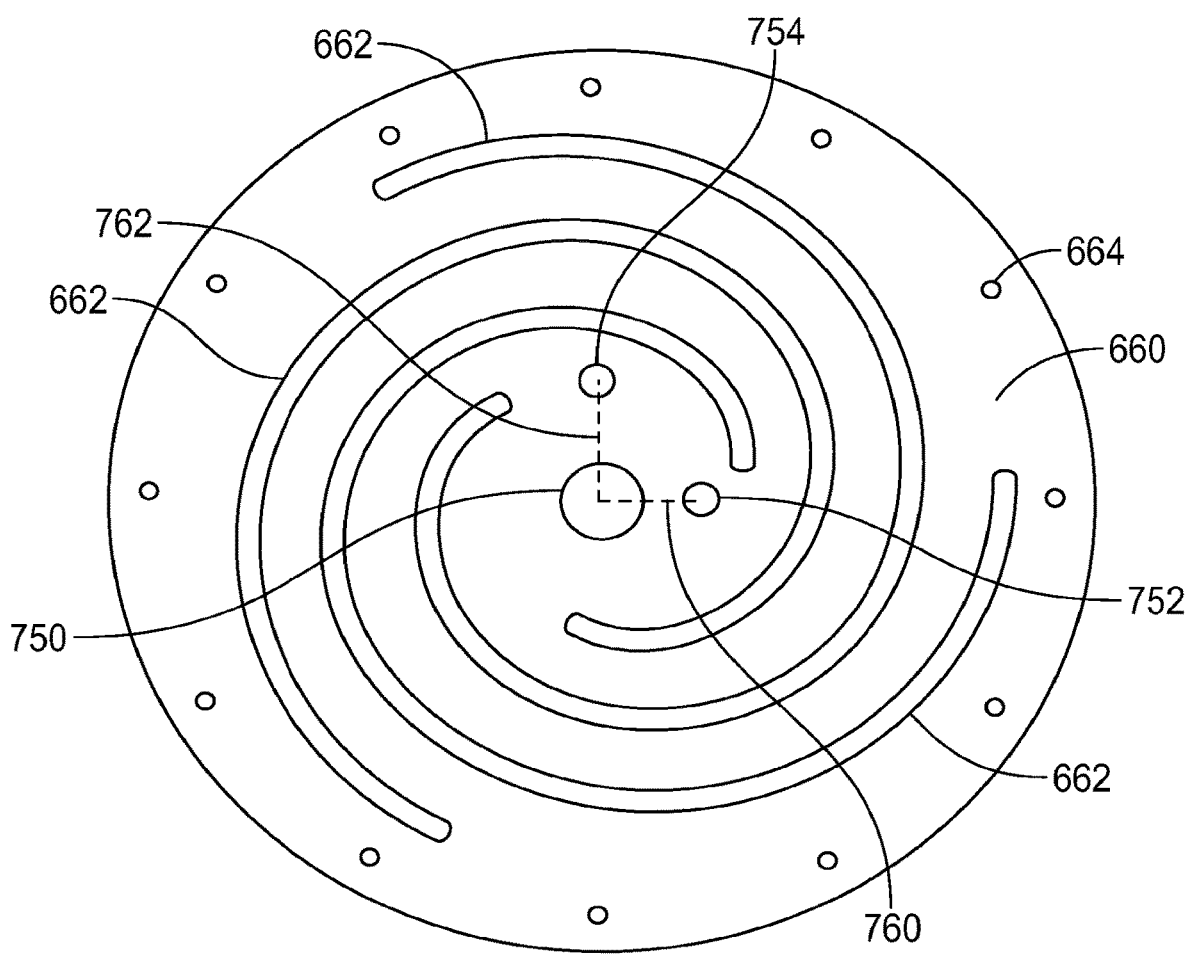
FIG. 14 is a rear view of a flexure in a beam steering mechanism in accordance with an embodiment.

FIG. 14 shows a rear side view of flexure 660 to illustrate an arrangement of the pivot anchor 620, first actuator 630, and second actuator 640 by showing one possible arrangement of the pivot point 750, first point 752, and second point 754. Anchor pivot point 750 and first point 752 are connected by a first imaginary line 760, and anchor pivot point 750 and second point 754 are connected by a second imaginary line 762. As seen in FIG. 14, first imaginary line 760 and second imaginary line 762 are non-parallel, which allows mirror 600 to move with two degrees of freedom through flexing of flexure 660, thereby allowing an aiming direction of the incident laser beam to be varied in two dimensions. While FIG. 14 shows that first imaginary line 760 and second imaginary line 762 are orthogonal, this is not required, and it will be recognized that mirror 600 can have two degrees of freedom as long as first imaginary line 760 and second imaginary line 762 are non-parallel.

As noted above, flexure 660 may be a flat spiral flexure formed of a thin metal, thin plastic, or similar flexible material. FIG. 14 shows that the spiral flexure may be formed by forming a plurality of spiral holes 662 into a flat plate. One or more supports 670 may be connected to an outer periphery of flexure 660 at points 664. It will be understood that FIG. 14 is shown only as an example of a spiral flexure, and flexure 660 is not limited to this specific shape, arrangement, number, or size of holes 662. Attaching mirror 600 to flexure 660 may help to preserve a lifetime of beam steering mechanism, as flexure 660 allows for a significantly larger number of bend cycles due to the lack of frictional wear found in systems using bearings or ball pivots.

While the present disclosure describes at some length and with some particularity with respect to the several described embodiments, it is not intended that it should be limited to any such particulars or embodiments or any particular embodiment, but it is to be construed so as to provide the broadest possible interpretation in view of the related art and, therefore, to effectively encompass various embodiments herein. Furthermore, the foregoing describes various embodiments foreseen by the inventor for which an enabling description was available, notwithstanding that modifications of the disclosure, not presently foreseen, may nonetheless represent equivalents thereto.

The invention claimed is:

1. A beam steering mechanism comprising:
a mirror comprising a first surface and a second surface opposite to the first surface, the first surface being a mirrored surface;
a frame;
a pivot anchor having a first end fixed to the frame and a second end connected to a pivot point of the second surface; and
a first actuator comprising a first output end, the first output end of the first actuator being connected to a first point on the second surface of the mirror,
wherein the first actuator comprises:
a first motor comprising a first magnet and a first coil;
a first stator structured to support the first magnet;
a first stationary pole arranged coaxially with the first stator and provided to a radially inner side of the first magnet;
a first bobbin structured to support a first winding of the first coil;
a first non-contact position detector subsystem that is mounted along a first path over which the first bobbin moves; and
a first flexible circuit connected between the first coil that is supported by the first bobbin and a first energy source, the first flexible circuit providing energy to the first coil and constraining rotation of the first bobbin relative to the first stator,
wherein the first stationary pole is ground with a precision such that residual rotation of the first bobbin resulting from a yield of the first flexible circuit does not affect an accuracy of the first non-contact position detector subsystem.

2. The beam steering mechanism of claim 1, wherein the first bobbin is arranged coaxially with the first stator and the first stationary pole and positioned to a radially inner side of the first magnet and a radially outer side of the first stationary pole, and
wherein a first inner diameter of the first bobbin is larger than a first outer diameter of the first stationary pole so that a first gap is provided between a first inner surface of the first bobbin and a first outer surface of the first stationary pole.

3. The beam steering mechanism of claim 2, wherein a positive air pressure is supplied to the first gap to provide an air cushion in the first gap so that the first bobbin is structured to move in a first axial direction of the first actuator without contacting the first stationary pole.

4. The beam steering mechanism of claim 2, further comprising a first actuator rod connected to an end of the first bobbin, the first actuator rod extending in a first axial direction of the first actuator away from the first bobbin;
    wherein the first output end of the first actuator is a tip end of the first actuator rod.

5. The beam steering mechanism of claim 1, further comprising a second actuator having a second output end, the second output end of the second actuator is connected to a second point on the second surface of the mirror.

6. The beam steering mechanism of claim 5, wherein a first line connecting the pivot point of the second surface and the first point on the second surface is non-parallel to a second line connecting the pivot point of the second surface and the second point on the second surface.

7. The beam steering mechanism of claim 6, wherein the first line and the second line are orthogonal.

8. The beam steering mechanism of claim 1, wherein the first non-contact position detector subsystem comprises a plurality of first emitters and first photodetectors arranged around a circumference of the first path, with the plurality of first emitters shining light on the first bobbin and the plurality of first photodetectors detecting light reflected from the first bobbin to determine a relative position of the first bobbin.

9. A beam steering mechanism comprising:
    a mirror comprising a first surface and a second surface opposite to the first surface, the first surface being a mirrored surface;
    a flexure having a first surface and a second surface, the first surface of the flexure being fixed to the second surface of the mirror;
    a frame;
    a plurality of supports, each of the plurality of the supports having a first end fixed to the frame and a second end fixed to the flexure;
    a pivot anchor having a first end fixed to the frame, and a second end connected to a pivot point of the second surface of the mirror through a hole in the flexure or connected to a pivot point of the second surface of the flexure; and
    a first actuator comprising a first output end, the first output end of the first actuator being connected to the flexure at a first point,
    wherein the first actuator comprises
    a first motor comprising a first magnet and a first coil;
    a first stator structured to support the first magnet;
    a first stationary pole arranged coaxially with the first stator and provided to a radially inner side of the first magnet;
    a first bobbin structured to support a first winding of the first coil,
    a first non-contact position detector subsystem that is mounted along a first path over which the first bobbin moves; and a first flexible circuit connected between the first coil that is supported by the first bobbin and a first energy source, the first flexible circuit providing energy to the first coil and constraining rotation of the first bobbin relative to the first stator,
    wherein the first stationary pole is ground with a precision such that residual rotation of the first bobbin resulting from a yield of the first flexible circuit does not affect an accuracy of the first non-contact position detector subsystem.

10. The beam steering mechanism of claim 9, wherein the first bobbin is arranged coaxially with the first stator and the first stationary pole and positioned to a radially inner side of the first magnet and a radially outer side of the first stationary pole, and
    wherein a first inner diameter of the first bobbin is larger than a first outer diameter of the first stationary pole so that a first gap is provided between a first inner surface of the first bobbin and a first outer surface of the first stationary pole.

11. The beam steering mechanism of claim 10, wherein a positive air pressure is supplied to the first gap to provide an air cushion in the first gap so that the first bobbin is structured to move in a first axial direction of the first actuator without contacting the first stationary pole.

12. The beam steering mechanism of claim 10, further comprising a first actuator rod connected to an end of the first bobbin, the first actuator rod extending in a first axial direction of the first actuator away from the first bobbin,
    wherein the first output end of the first actuator is a tip end of the first actuator rod.

13. The beam steering mechanism of claim 9, further comprising a second actuator comprising a second output end, the second output end being connected to the flexure at a second point.

14. The beam steering mechanism of claim 13, wherein a first line connecting the pivot point of the second surface of the mirror and the first point, or connecting the pivot point of the second surface of the flexure and the first point, is non-parallel to a second line connecting the pivot point of the second surface of the mirror and the second point, or connecting the pivot point of the second surface of the flexure and the second point.

15. The beam steering mechanism of claim 14, wherein the first line and the second line are orthogonal.

16. The beam steering mechanism of claim 9, wherein the first position detector subsystem comprises a plurality of first emitters and first photodetectors arranged around a circumference of the first path, with the plurality of first emitters shining light on the first bobbin and the plurality of first photodetectors detecting light reflected from the first bobbin to determine a relative position of the first bobbin.

17. The beam steering mechanism of claim 9, wherein the flexure is a flat spiral flexure.

* * * * *